May 5, 1953     A. HYSLOP, JR     2,637,353
TRAVELING-SAW MACHINE WITH AUTOMATIC GUARD
Filed Jan. 8, 1948     2 SHEETS—SHEET 1

INVENTOR.
ANDREW HYSLOP, JR.

BY *Desjardins & Compton*
HIS ATTORNEYS

INVENTOR.
ANDREW HYSLOP, JR.

Patented May 5, 1953

2,637,353

UNITED STATES PATENT OFFICE 2,637,353

TRAVELING-SAW MACHINE WITH AUTOMATIC GUARD

Andrew Hyslop, Jr., Adena, Ohio

Application January 8, 1948, Serial No. 1,147

6 Claims. (Cl. 143—47)

This invention relates to a saw machine, and more particularly pertains to one wherein a saw guard is automatically moved to an effective position before the saw makes a cutting excursion, said guard also acting to hold the workpiece against the wall of a material holding trough.

The invention includes the provision of a saw bench having a work-receiving trough formed with a saw slot cut transversely therein to permit the excursion of a saw, a reciprocable platform supporting a motor-driven saw, which platform is moved from a normal position in an excursive movement each cutting operation, a combined saw guard and work clamp movable from an ineffective position, where it is out of the way of materials being loaded into the trough, and hydraulic actuating means operable, when the guard and saw are in ineffective position to move the guard to effective position and then to move the saw in a cutting movement, in sequence, and operable when the saw has completed its cutting excursion to return the saw and thereafter to return the guard to ineffective position, in that order. The hydraulic system is controlled through the operation of a plurality of by-pass valves which are rendered effective by an operator controlled valve to operate in one sequence or another.

The device is particularly suitable for use in mines where timbers for supporting the ceiling and walls must be cut to post size under hazardous conditions, the automatic sequential operation of the device preventing exposure of workmen to the rotating saw.

Therefore, it is an object of my invention to provide a reciprocable saw device with a combined saw guard and work clamping element which must be brought to effective position before the saw starts to move to cutting position, and in which the saw must move away from cutting position before the guard is retracted.

Another object of the invention is to provide such a device in which the movement of the guard and saw is accomplished hydraulically and in which the sequential action is controlled by selectively operable by-pass relief valves.

Further objects, and objects relating to details of construction will definitely appear from the detailed description to follow. In one instance, I have accomplished the objects of my invention by the devices and means set forth in the following specification. My invention is clearly defined and pointed out in the appended claims. A structure constituting a preferred embodiment of my invention is illustrated in the accompanying drawings, forming a part of this specification, in which:

The same reference numerals are applied to the same parts throughout the several views and the sections are taken on the section lines looking in the direction of the arrows.

Figure 2:
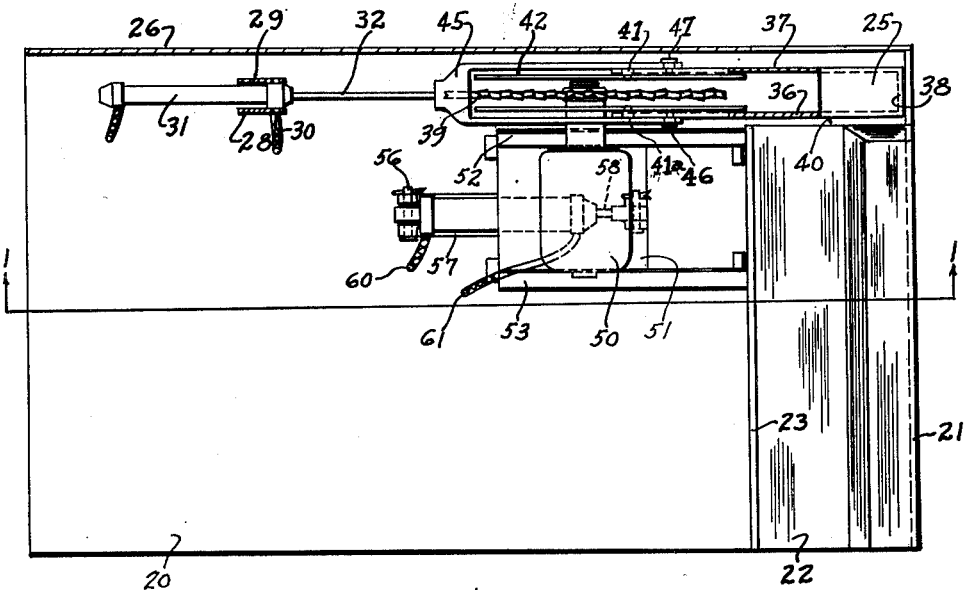
Fig. 2 is a section taken on the line 2—2 of Fig. 1.

The saw bench comprises a bottom plate 20, bent upwardly to form a front wall 21, then backwardly and downwardly to form a work-receiving trough 22, then upwardly to form a vertical wall 23 against which a timber 24 (Fig. 1) may be clamped by guard 25 to be described. A vertical side plate 26, has a bent-over top 27 from which depend spaced support plates 28 and 29 to which is pivoted at 30 the forward end of a cylinder 31 having a piston, not shown, to which is attached piston rod 32 which actuates guard 25 to and from effective position. Fluid, under pressure, admitted to the cylinder through tube 33 retracts the piston rod and fluid, under pressure, admitted through tube 34 projects the piston rod.

Figure 3:
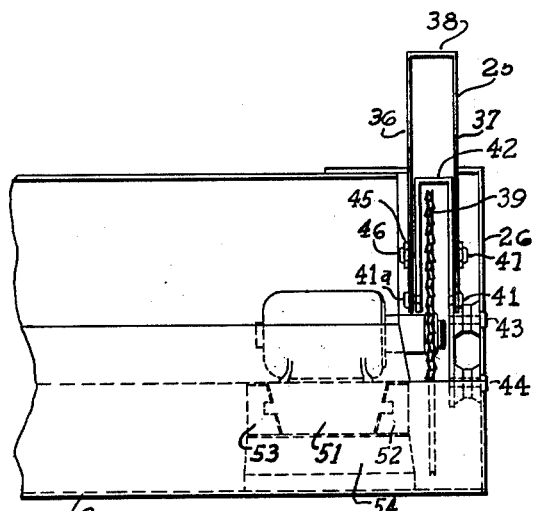
Fig. 3 is a front elevation of the guard mechanism showing the guard in ineffective position.

Referring to Fig. 3, the guard comprises side walls 36 and 37 and edge piece 38, giving the guard a U-shaped cross-section enabling it to shroud the circular saw 39 when the guard is moved to effective position and the saw moved forward into the saw slot 40 (see Fig. 2), cut transversely of the work-receiving trough. The guard has a sickle-shaped contour as seen in side elevation which enables it to clamp a timber 24 (Fig. 1), when in the effective position, against wall 23. The guard is pivoted at 41a and 41 (Fig. 3) to an inverted U-shaped support frame 42 secured by a downwardly extended long leg of the U to side plate 26 by bolts 43 and 44.

Figure 1:
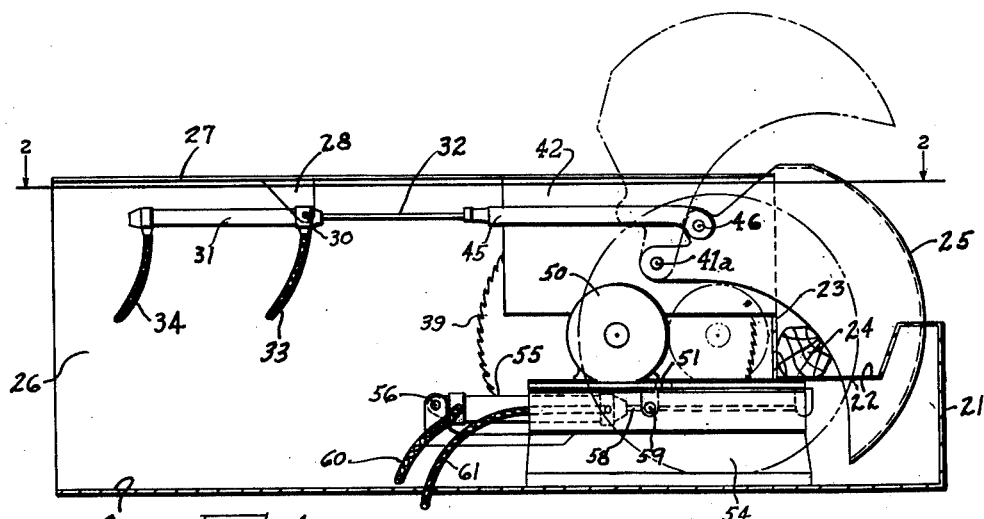
Fig. 1 is a longitudinal section through the machine on the line 1—1 of Fig. 2, showing the guard in effective position and the saw about to move in a cutting direction. The dotted representation of the guard shows its ineffective position, and the dotted representation of the saw shows its extreme cutting position.

Referring to Figs. 1 and 2, piston rod 32 ends in a fork 45 pivotally connected to side walls 36 and 37 of the guard by pins 46 and 47 so that on retraction of piston rod 32 the guard is moved to ineffective position, as shown in dotted line in Fig. 1, and so that on projection of piston rod 32 the guard is moved to effective position, as shown in full line in Fig. 1. The single pivot 30 around which the cylinder 31 may rock provides for the necessary alignment of the parts during operative movements thereof.

The saw 39 is mounted on the shaft of motor 50 mounted on platform 51 (see Fig. 2) slidable forwardly and backwardly on tracks 52 and 53 (see also Fig. 3) supported by base 54. Although the particular embodiment shows a circular saw the invention is not limited to such type of saw as, for instance, a chain saw could be used instead.

A hydraulic cylinder or motor 55 pivoted at its rear end, by pin 56, to a bracket 57, secured to base 54, has a piston, not shown, from which extends a piston rod 58, pivoted by pin 59 to platform 51. Fluid, under pressure admitted to the cylinder 55 through tube 60, projects the piston to move the platform forwardly, from the normal rest position shown in Figs. 1 and 2, to a position which brings the saw to the dotted line position shown in Fig. 1. Fluid, under pressure, admitted to the cylinder through tube 61 retracts the piston rod to bring the platform and saw back to a rest, or ineffective, position.

The novel hydraulic means, provided, is operable one way, by an operator, to supply fluid, under pressure, when the guard is in ineffective position and the motor is in rest position, to first move the guard from the dotted line position, shown in Fig. 1, to the full line position, to guard the saw to be moved into the slot and to clamp the workpiece against the wall 23 of the trough, and thereafter upon pressure developing in the hydraulic system to by-pass the fluid, through relief valves to the cylinder connected to the saw platform, by means of the tube 60, to move the platform to cause the saw to make a cutting movement into the saw slot 40. The hydraulic system is then operable to supply fluid first to cylinder 55, through tube 61 to bring the platform and supported saw back to rest position and, thereafter, by means of by-pass pressure relief valves to supply fluid to cylinder 31 through tube 33 to retract the guard.

Figure 4:
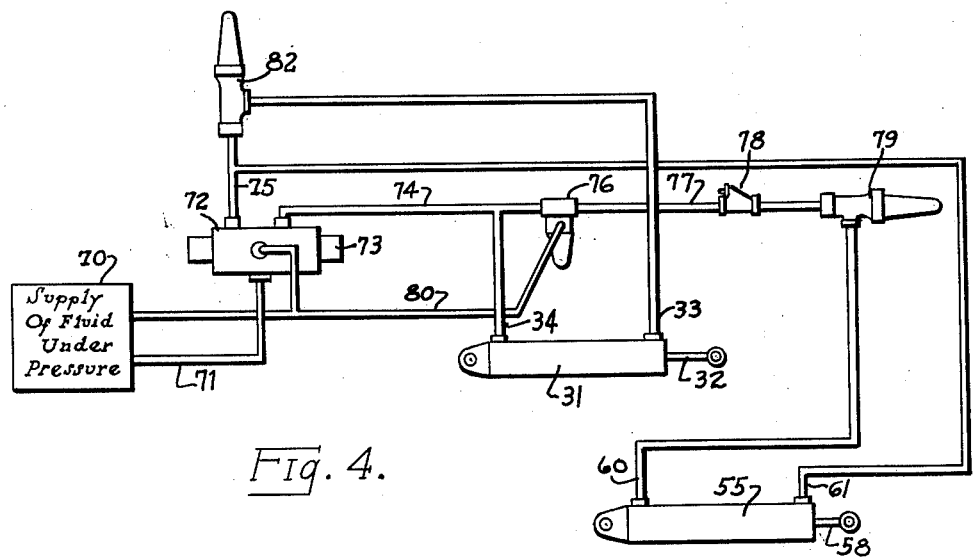
Fig. 4 is a diagrammatic layout of the hydraulic system.

This hydraulic system is shown, diagrammatically, in Fig. 4. A source of fluid 70, under pressure, is connected by pressure line 71 to two way valve 72 operable by member 73 to direct the fluid either through pipe 74 or pipe 75. When the guard is retracted and the saw is in ineffective position, member 73 is operated to direct fluid through pipe 74 which enters cylinder 31 through tube 34 forcing the piston in a direction to project piston rod 32 which moves the guard to effective position and clamps the work piece until the pressure rises in pipes 74 and 77 until at an adjusted critical point it opens a by-pass relief valve 78 to admit fluid to tube 60 which projects the piston 58 to move the saw in a cutting excursion. Valve 79 permits free flow of fluid in the opposite direction toward the source of supply. Valve 76 is a relief valve, which opens after the saw has moved to its limit in a cutting direction, to return the flow through pipe 80 to the fluid supply 70. Valve 78 is adjustable to control the rate of flow to cylinder 55 so as to determine the speed of its cutting movement. As the piston rod of cylinder 31 is projected the fluid on the side of the piston associated with tube 33 is returned to the source of supply through valve 82 which is free flowing in that direction but which permits flow in the other direction only above an adjusted critical pressure.

At the conclusion of the cutting operation valve 72 is operated to direct the fluid flow through pipe 75 and tube 61 to cylinder 55 to cause the piston rod to retract and return the saw to rest position, after which the pressure builds up so the fluid is passed by by-pass relief valve 82 to tube 33 to cause piston rod 32 to retract which moves the guard to ineffective position. As the piston of cylinder 55 retracts valve 79 permits return of flow of the fluid on the side of the piston associated with tube 60. This completes the sequence of a full operation. It will be understood that valves 78, 79 and 82 permit free flow only in the direction of the fluid source.

The hydraulic system outlined works as well with gas under pressure as it does with liquid under pressure and the invention is not limited in that respect.

It will be understood that the sequence of operation of the parts is such that an operator is fully protected from contact with the saw as the guard is always in effective position when the saw makes a cutting excursion or is returning from one.

I am aware that the devices and constructions shown herein may be varied considerably without departing from the spirit of my invention, and therefore, I claim my invention broadly, as indicated by the appended claims.

Having thus described my invention, what I claim as new and useful and desire to secure by Letters Patent, is:

1. A device for sawing lengths of material crosswise comprising a saw bench having a trough in which an article to be sawn is supported, said trough having a transverse slot at a cutting station; a movable saw platform having a normal position and an operating position for carrying a power driven saw to move the saw into the saw slot in a cutting movement when said platform is moved from normal position to operating position; a combined saw guard and material holder mounted on the bench and movable from an ineffective position to an effective position to clamp material against the trough wall and to act as a safety guard for the saw while in cutting position in the slot; a power source of fluid under pressure; a first hydraulic piston and cylinder connected to said combined saw guard and material holder for moving it between its ineffective and effective position; a second hydraulic piston and cylinder connected to said saw platform for moving it between its normal and operating position; a manually operable two-way valve for controlling the operation of said pistons, fluid pressure connections from said valve to said first named cylinder for supplying fluid under pressure to said cylinder to move the piston therein and said combined saw guard and material holder from ineffective to effective position; fluid pressure connecting means including a pressure relief valve for connecting said second named cylinder to said fluid pressure source when the pressure in said first named cylinder exceeds a predetermined amount whereby said movable platform is moved from normal to operating position only when clamping pressure is applied to the material by said combined saw guard and material holder; said manually operable valve being arranged to reverse the flow of pressure fluid upon being manually shifted to reverse the direction of the piston in said second named cylinder to withdraw said platform from operating to normal position, the fluid pressure connections to said first named cylinder including a pressure responsive valve for supplying pressure fluid to said first named cylinder in the opposite direction only when the pressure in said second named cylinder exceeds a predetermined amount to thereby return said saw guard and material holder from its effective to its ineffective position only after said saw platform has been withdrawn to its normal position.

2. A device for sawing comprising: a frame having a cutting station at which the article to be sawed is supported; saw means carried by said frame and movable from a non-operating to an operating position for sawing an article supported at said cutting station; combined guard and holding means carried by said frame and movable from an ineffective to an effective position to clamp the article against the frame at the cutting station and to act as a safety guard for the saw means while in operating position; a source of fluid under pressure; a first fluid motor means operably associated with the combined guard means for moving it between its said ineffective and effective positions; a second fluid motor means operably associated with said saw means for moving it between its said non-operating and operating positions; and a hydraulic circuit interconnecting said motor means and said pressure source including a first pressure responsive valve operable responsive to a predetermined pressure applied to the guard motor means when in holding engagement with the article to be sawed, to connect the saw motor means to said pressure source for moving said saw means from non-operating to operating position only when said guard and holding means is applying clamping pressure to the article at the cutting station and a second pressure responsive valve operable responsive to a predetermined pressure applied to the saw motor means when holding said means in an extreme non-operating position, to connect the guard motor means to said pressure source for moving said guard and holding means from effective to ineffective position only when said saw means is in non-operating position.

3. A device for sawing comprising: a frame having a cutting station at which the article to be sawed is supported; saw means carried by said frame and movable from a non-operating to an operating position for sawing an article supported at said cutting station; combined guard and holding means carried by said frame and movable from an ineffective to an effective position to clamp the article against the frame at the cutting station and to act as a safety guard for the saw means while in operating position; a source of fluid under pressure; a first fluid motor means operably associated with the combined guard means for moving it between its said ineffective and effective positions; a second fluid motor means operably associated with said saw means for moving it between its said non-operating and operating positions; and a hydraulic circuit interconnecting both of said motor means and said pressure sources including means for controlling the propulsion and retraction of said saw means, said saw propulsion controlling means including a pressure responsive valve operable responsive to a predetermined pressure applied to move the guard means to effective position and built up by holding it in engagement with the article to be sawed for applying pressure to the saw motor means to move the latter to operating position only when said guard and holding means is applying clamping pressure to the article at the cutting station; said saw retraction controlling means including a pressure responsive valve operable responsive to a predetermined pressure applied to the means to move the saw means to non-operating position and built up by holding it in such a position for applying pressure to the guard motor means to move said guard and holding means from effective to ineffective position only when said saw means is in an extreme retracted non-operating position.

4. A device for sawing comprising: a frame having a cutting station at which the article to be sawed is supported; saw means carried by said frame and movable from a non-operating to an operating position for sawing an article supported at said cutting station; combined guard and holding means carried by said frame and movable from an ineffective to an effective position to clamp the article against the frame at the cutting station and to act as a safety guard for the saw means while in operating position; a source of fluid under pressure; a first double acting fluid motor means operably associated with said combined guard means for moving it in either direction between its said ineffective and effective positions; a second double acting fluid motor means operably associated with said saw means for moving it in either direction between its said non-operating and operating positions; and a hydraulic circuit interconnecting both of said motor means and said pressure sources including a first valve means effective to apply pressure to the saw motor means in a direction to move the saw to operating position responsive to a predetermined pressure built up by the motor of the guard means upon moving the latter to its effective position and positively holding it in such a position; and a second valve means effective to apply pressure to the guard motor means in a direction to move the guard to ineffective position responsive to a predetermined pressure built up by the motor of the saw means upon moving the latter to its inoperative position and positively holding it in such a position; whereby the saw means cannot be moved to cutting position until the guard is in protective position and whereby further the guard cannot be moved away from the protective position until the saw is moved out of cutting position.

5. In a sawing device of the class described, a frame having a stationary cutting station at which the article to be sawed is supported, a saw platform guided for slidable movement along said frame to and from said cutting station, a circular saw rotatably mounted on said platform, means for driving said saw, a saw guard having an arcuate undersurface formed to afford gripping engagement with the article to be sawed and pivotally mounted upon said frame for movement about a transverse axis disposed above said platform into gripping engagement with the article to be sawed and into guarding engagement with said saw, a double acting fluid operated cylinder and piston for moving said platform and saw to and from said cutting station, a double acting fluid operated cylinder and piston pivotally connected with said guard for moving and positively holding said guard in position to guard the saw and in gripping engagement with the article to be sawed, a source of supply of fluid under pressure, a two-way valve connected therewith, a fluid connection from said valve to one end of said second cylinder to supply fluid under pressure thereto to move said guard into gripping engagement with the article to be sawed, another fluid connection from said valve to one end of said first-mentioned cylinder to supply fluid under pressure thereto to retract the saw, and two pressure responsive valves, one being connected from said first-mentioned fluid connection to the end of said first cylinder opposite from the point of connection of said second-mentioned fluid connection thereto and the other being connected from said second-mentioned fluid connection to the end of said second-mentioned cylinder opposite from the point of connection of said first-mentioned fluid connection thereto, each of said pressure responsive valves being operated to by-pass fluid to their respective cylinders to operate the same only when the cylinder directly connected thereto has reached the extreme end of its operating stroke, whereby a definite sequence of operation is provided for said guard and saw, preventing release of the guard from the article being sawed until the saw is in an extreme retracted position, and preventing movement of said saw toward said work station until the guard is in an extreme clamping and guarding position.

6. In a sawing device of the class described, a frame having an upright wall against which the work is clamped during the sawing operation, a platform mounted on said frame for movement toward and from said upright wall, a saw rotatably mounted on said platform, a motor for driving said saw, fluid operated motor means operatively connected with said platform for moving it between its operating and non-operating positions and holding it in such positions, work holding and saw guarding means extending over the top of said saw and affording a guard therefor in all positions of said table with respect to said trough, including an inverted generally U-shaped stationary support extending over the top of said saw and having side walls extending downwardly along the sides thereof, and a guard and work holding member of an inverted U-shaped form in cross section pivotally mounted on said side walls and forming a continuation thereof and movable to extend in advance thereof and downwardly therefrom, the undersurfaces of the walls of said guard forming arcuate engaging surfaces extending along opposite sides of the saw and movable into position to clamp the article to said upright wall, fluid operated motor means positively engaging said arcuate engaging surfaces with the work to be sawed and positively holding said guard in guarding position with respect to said saw, and control means for said motor means, operating one motor means by pressure built up in the other motor means when in an extreme operating position, thereby preventing advancing of the platform when the guard is in a non-guarding and holding position, and release of the guard when the platform is in an advanced operating position.

ANDREW HYSLOP, Jr.

References Cited in the file of this patent

UNITED STATES PATENTS

| Number | Name | Date |
|---|---|---|
| 1,411,045 | Leaver | Mar. 28, 1922 |
| 1,640,517 | Procknow | Aug. 30, 1927 |
| 1,670,946 | Wolf | May 22, 1928 |
| 1,795,203 | Eskridge | Mar. 3, 1931 |
| 2,171,541 | Crouch | Sept. 5, 1939 |
| 2,301,028 | Esch | Nov. 3, 1942 |
| 2,327,920 | Moohl | Aug. 24, 1943 |
| 2,365,987 | Zimmermann | Dec. 26, 1944 |
| 2,511,563 | Bullard | June 13, 1950 |

FOREIGN PATENTS

| Number | Country | Date |
|---|---|---|
| 517,979 | Germany | Feb. 12, 1931 |